United States Patent
Muggli et al.

(10) Patent No.: US 6,589,616 B2
(45) Date of Patent: *Jul. 8, 2003

(54) PACKAGING CONTAINER

(75) Inventors: Olivier Yves A. Muggli, Louisville, KY (US); Erwin Pasbrig, Hilzingen (DE)

(73) Assignee: Alcan Technology & Management Ltd., Neuhausen am Rheinfall (CH)

( * ) Notice: Subject to any disclaimer, the term of this patent is extended or adjusted under 35 U.S.C. 154(b) by 0 days.

This patent is subject to a terminal disclaimer.

(21) Appl. No.: 09/964,576

(22) Filed: Sep. 28, 2001

(65) Prior Publication Data

US 2002/0041943 A1 Apr. 11, 2002

Related U.S. Application Data

(62) Division of application No. 09/068,557, filed as application No. PCT/CH96/00409 on Nov. 18, 1996, now Pat. No. 6,337,113.

(30) Foreign Application Priority Data

Nov. 28, 1995 (CH) .............................. 03373/95

(51) Int. Cl.$^7$ .................... B32B 27/32; B32B 27/34; B32B 27/36
(52) U.S. Cl. .................... 428/35.2; 428/35.7; 428/35.9; 428/36.6; 428/36.7; 428/458; 428/461; 428/474.4; 428/474.7; 428/476.1; 428/476.9; 428/480; 428/483; 383/908; 53/428; 53/432; 53/440; 264/291
(58) Field of Search ................ 428/35.2, 35.7, 428/35.9, 36.6, 36.7, 458, 461, 474.4, 474.7, 476.1, 476.9, 480, 483; 383/908; 53/428, 432, 440; 264/291

(56) References Cited

U.S. PATENT DOCUMENTS

| | | | | |
|---|---|---|---|---|
| 3,836,425 A | * | 9/1974 | Whiting, Jr. ................ | 428/213 |
| 4,085,244 A | * | 4/1978 | Stillman ..................... | 206/484 |
| 4,216,268 A | * | 8/1980 | Stillman ..................... | 428/192 |
| 4,284,672 A | * | 8/1981 | Stillman ..................... | 206/524.2 |
| 4,874,656 A | * | 10/1989 | Rantanen ................. | 206/524.2 |
| 5,193,265 A | | 3/1993 | Muggli et al. ............. | 29/527.4 |
| 5,589,275 A | * | 12/1996 | Breitler et al. ............. | 206/531 |
| 6,337,113 B1 | * | 1/2002 | Muggli et al. ............. | 383/908 |

FOREIGN PATENT DOCUMENTS

| | | | |
|---|---|---|---|
| DE | 3905370 | * | 8/1990 |
| EP | 0203265 | * | 12/1986 |
| EP | 0317237 | * | 5/1989 |
| EP | 0414636 | * | 2/1991 |
| EP | 0455584 | * | 11/1991 |
| EP | 474587 A | * | 3/1992 |
| JP | 229224/92 | | 8/1992 |
| WO | WO 94/19184 | * | 9/1994 |
| WO | WO 95/09608 | | 4/1995 |

* cited by examiner

Primary Examiner—Rena Dye
(74) Attorney, Agent, or Firm—Fisher, Christen & Sabol

(57) ABSTRACT

Packaging containers produced from a composite shaped by cold-forming, the term "packaging containers" including base or lid parts or base or lid parts shaped by cold-forming. The base or lid parts can be shaped by cold-forming, and a lid foil or base foil, respectively, can form the corresponding closure for the packaging container. In addition, both the base and the lid part can be shaped by cold-forming, the depressions formed in the base and lid parts advantageously lying opposite one another. Examples of these packaging containers are strip packing or blister packaging for pharmaceutical products. The composite from which the packaging container or parts thereof are produced has a layered structure, for example, comprising: (a) a plastics foil between 10 $\mu$m and 250 $\mu$m thick; (b) a bi- or monoaxially oriented foil selected from the group comprising polyvinylchloride foils, polyolefin foils, polyamide foils or polyester foils between 10 and 100 $\mu$m thick, or a bi- or monoaxially oriented plastics foil composite comprising two foils selected from the group comprising polyvinylchloride foils, polyolefin foils, polyamide foils or polyester foils each between 10 and 50 $\mu$m thick; (c) a metal foil between 20 and 200 $\mu$m thick; and ($a_1$) a plastics foil between 10 and 250 $\mu$m thick. The packaging containers are characterized by a high degree of flatness and/or rigidity.

16 Claims, No Drawings

PACKAGING CONTAINER

This application is a division of U.S. application Ser. No. 09/068,557, filed on May 20, 1998, now U.S. Pat. No. 6,337,113, that is a 371 of International Patent Application PCT/CH96/00409, filed on Nov. 18, 1996, that has priority benefit of Swiss Patent Application 03373/95, filed on Nov. 28, 1995.

BACKGROUND OF THE INVENTION

The invention relates to a packaging container made from a cold formed composite, a process for its manufacture and the use thereof.

1. Field of the Invention

It is known to employ packaging means for the purpose of protecting, e.g., pharmaceutical products, medical aids, diagnostic aids and other products which are sensitive to light, gas and/or moisture. Particularly suitable types of packaging are shaped forms of packaging made by stretching, stretch drawing, or deepening. In order to make packaging impermeable to light, gas and vapors, the material from which the packaging is made must have a barrier layer. A particularly suitable barrier layer may be, e.g., a metal foil or metal strip. In practice, as the metal foil alone is not able to fulfill all of the requirements made of a packaging material, further layers—in particular layers of plastic—are applied to one or both sides of the metal foil. Such layers may, e.g., be extrusion bonded or layers in the form of films of thermoplastics attached by means of adhesive agents. With such multilayer laminates readily formable packaging materials are produced that can be processed further, e.g., into the base parts of blister packs or other forms of packaging.

It has now been found that none of the laminates which have found use in practice exhibit sufficient flatness and/or stiffness for further processing after being shaped into packaging forms or parts such as the base part of packaging. It has also been found that laminates which exhibit inadequate flatness and/or stiffness, after shaping into parts for packaging such as base parts for blister packs or push-through packs, result in shaped parts that also exhibit inadequate flatness and/or stiffness. By flatness is meant here that the laminate exhibits a tendency to roll or parts formed out of the laminate are domed and e.g. do not lie uniformly on a flat surface, but instead are curved in a wavy, arched or dome-like manner.

2. Broad Description of the Invention

The object of the present invention is therefore to propose a packaging container which is manufactured out of a composite and the packaging container exhibits a high degree of flatness and/or stiffness.

That objective is achieved by way of the invention in that the composite from which the packaging container or parts thereof is/are manufactured exhibits a layered structure containing:

a) a plastic film having a thickness of 10 μm to 250 μm,
b) a biaxially or uniaxially stretched film of the polyvinylchloride, polyolefin, polyamide or polyester type having a thickness of 10 to 100 μm, or a biaxially or uniaxially stretched plastic laminate of two films of the polyvinylchloride, polyolefin, polyamide or polyester type each having a thickness of 10 to 50 μm,
c) a metal foil having a thickness of 20 to 200 μm, and
$a_1$) a plastic film having a thickness of 10 to 250 μm, and the packaging container exhibits a high degree of flatness and/or stiffness.

Usefully, according to the present invention packaging containers, or parts thereof, exhibit a laminate which features between layer
c), the metal foil having a thickness of 20 to 200 μm, and
$a_1$) the plastic film having a thickness of 10 to 250 μm,
a layer
$b_1$) a biaxially or uniaxially stretched film of the polyvinylchloride, polyolefin, polyamide or polyester type having a thickness of 10 to 100 μm, or a biaxially or uniaxially stretched plastic laminate of two films of the polyvinylchloride, polyolefin, polyamide or polyester type each having a thickness of 10 to 50 μm.

DETAILED DESCRIPTION OF THE INVENTION

In practice layer a) is on the side of the container facing outwards, while layer $a_1$) forms the side of the container facing inwards i.e. the inner face.

The plastic films a) and $a_1$) may e.g. be of thermoplastics such as halogen-containing polymers, polyesters, polyolefins, polyamides or acrylnitrile copolymers. The plastic films a) and $a_1$) may preferably be non-stretched or if desired uniaxially or biaxially stretched.

The layers b) and $b_1$) are biaxially or uniaxially stretched plastic films. Usefully, the plastic films b) and $b_1$) are of the uniaxially stretched polyvinylchloride or uniaxially or biaxially stretched polyamide, polypropylene and polyester film type or laminates.

Examples of plastics a), b), $a_1$) and $b_1$) based on halogen-containing polymers are polymers of vinylchloride (PVC) and vinyl plastics, containing vinylchloride units in their structure, such as copolymers of vinylchloride and vinylesters of aliphatic acids, copolymers of vinylchloride and esters of acrylic or methacrylic acids or acrylnitrile, copolymers of diene compounds and unsaturated dicarboxyl acids or their anhydrides, copolymers of vinylchloride and vinylchloride with unsaturated aldehydes, ketones etc. or polymers and copolymers of vinylidenchloride with vinylchloride or other polymerizable compounds. The vinyl-based thermoplastics may also be made soft in a conventional manner by means of primary or secondary softeners. Films out of PVC may in some cases also be uniaxially (oPVC) or biaxially stretched.

If the plastic films a), b), $a_1$), and $b_1$) are of polyesters (PET-films), then examples of the polyesters are polyalkylene-terephthalate or polyalkylene-isophthalate with alkylene groups or radicals with 2 to 10 carbon atoms or alkylene groups with 2 to 10 C atoms interrupted by at least one —O— atom, such as, polyethylene-terephthalate, polypropylene-terephthalate, polybutylene-terephthalate (polytetramethylene-terephthalate), polydecamethylene-terephthalate, poly-1,4-cyclohexyldimethylol-terephthalate or polyethylene-2,6-naphthalene-dicarboxylate or mixed polymers of polyalkylene-terephthalate and polyalkylene-isophthalate, where the fraction of isophthalate amount, e.g., to 1 to 10 mol. %, mixed polymers and terpolymers, also block polymers and grafted modifications of the above mentioned materials. Preferred are polyethylene-terephthalate films. Other useful polyesters are known in the field by the abbreviation PEN.

Other polyesters are copolymers of terephthalic acid and a further polycarboxyl acid with at least one glycol. Useful thereby are the copolymers of terephthalic acid, ethyleneglycol and an additional glycol. Preferred are glycol-modified polyesters known in the field as PETG.

Useful polyesters are polyalkylene-terephthalates with alkylene groups or radicals with 2 to 10 carbon atoms and polyalkylene-terephthalates with alkylene groups or radicals with 2 to 10 carbon atoms which are interrupted by one or two —O— atoms.

Further preferred polyesters are polyalkylene-terephthalates with alkylene groups or radicals with 2 to 4 carbon atoms and, very highly preferred, polyethylene-terephthalates belonging to which are also A-PET, PETP and the above mentioned PETG or G-PET.

Examples of polyolefins for plastic films a), b), $a_1$) and/or $b_1$) are polyethylenes (PE) e.g. high density polyethylene (HDPE, density larger than 0.944 g/cm$^3$, medium density polyethylene (MDPE, density 0.926–0.940 g/cm$^3$), linear polyethylene of medium density (LMDPE, density 0.926.0.940 g/cm$^3$), low density polyethylene (LDPE, density 0.910–0.925 g/cm$^3$) and linear low density polyethylene (LLDPE, density 0.916–0.925 g/cm$^3$), for example as non oriented (PE film) or uniaxially or biaxially oriented films, (oPE film), polypropylenes (PP), such as axially or biaxially oriented polypropylene (oPP film) or cast polypropylene (cPP film), amorphous or crystalline polypropylene or mixtures thereof, ataktic or isotaktic polypropylene or mixtures thereof, poly-1-butene, poly-3-methylbutene, poly-4-methylpententene and copolymers thereof, then polyethylene with vinylacetate, vinylalcohol, acrylic acid etc. such as e.g. ionomeric resins, such as copolymers of ethylene with 11% acrylic acid, methacrylic acid, acrylic esters, tetrafluo-rethylene or polypropylene, also statistical copolymers, block polymers or olefin polymer-elastomer mixtures. Preferred are high density polyethylenes and polypropylenes, also ionomers, e.g. known under the trade names Surlyn, and ethylene-acrylic acid copolymers (EAA).

If the plastic films a), b), $a_1$) and $b_1$) are polyamide films (PA) then e.g. the following belong to the polyamides viz., polyamide 6, a homo-polymer of ε-caprolactam (polycaprolactam); polyamide 11, polyamide 12, a homo-polymer of ω-laurinlactam (polylaurinlactam); polyamide 6.6, a homo-polycondensate of hexamethylenediamine and adipinic acid (poly-hexa-methylene-adi-amide); polyamide 6.10, a homo-polycondensate of hexa-methylene-diamine and sebacinic acid (poly-hexa-methylene-sebacamide); polyamide 6.12, a homo-polycondensate of hexa-methylene-diamine and dodecandic acid (poly-hexa-methylene-dodecanamide) or polyamide 6-3-T, a homo-polycondensate of trimethyl-hexa-methylene-diamine and terephthalic acid (poly-trimethyl-hexa-methylene-terephthalic-amide), and mixtures thereof. Films of polyamide may in some cases be uniaxially or biaxially stretched (oPA).

If the plastic films a), b), $a_1$) and $b_1$) are of acrylnitrile-copolymers, then e.g. the following are included in this group viz., copolymers of acrylnitrile or methacrylnitrile with acrylic acid esters, vinyl-carboxylate esters, vinyl halides, aromatic vinyl compounds or unsaturated carboxylic acid and diene and in particular acrylnitrile-methylacrylate copolymers (e.g. known under the trade name "BAREX".

If the above mentioned plastics are extrudable, then they may also be applied to the laminate in the form of an extruded layer.

Layer c), a metal foil, has a thickness of 20 to 200 μm, a thickness of 20 to 150 μm being useful and 30 to 60 μm being preferred. The metal foil may be of iron, steel, nickel, copper, tin, bronze, brass, aluminum, etc. The metal foil is advantageously of aluminum having a purity of 99.95% to 97% (wt. %), the remainder being the unavoidable accompanying impurities or alloying elements. Examples of alloys are those having aluminum as the main constituent and the alloying element Fe; Si; Mg; Ti and/or Cu.

The layers a), and $a_1$), i.e. the uniaxially or biaxially stretched films of plastics of the polyvinylchloride, polyolefin, polyamide or polyethyleneterephthalate type may usefully have thickness of 10 to 80 μm and advantageously a thickness of 12 to 50 μm. For plastic laminates the stated dimensions refer to the total thickness.

In order to join the described layers to each other, i.e., a) to b), b) to c), c) to $a_1$) or c to $b_1$) and $b_1$) to $a_1$), these may be adhered to each other by adhesives such as laminate coatings, laminate adhesives and/or adhesive agents and if desired by precoating with bonding materials, by hot calendering, by extrusion coating, by coextrusion coating or by means of a combination of these methods to form composites, laminates or films.

Suitable laminate adhesives may contain solvents, be solvent-free, or may be aqueous acrylic adhesives or poly-urethane adhesive systems. Adhesives which harden under the influence of electromagnetic rays (e.g. UV; electron beams) may, however, also be employed.

Preferred are polyurethane-based laminate adhesives.

For example, di-isocyanate or aliphatic polyesters may be employed as bonding agents. As a rule these bonding agents are only employed between the outwards facing layers.

Suitable coatings are e.g. those based on acrylates, epoxy resins, melaminic resins, uric resins, polyurethanes, cellulose nitrate, polyesters and mixtures thereof. The coatings may e.g. be solvent-based or water-based, or may be single, two or more component systems. The coatings are hardenable e.g. by drying, by application of heat, chemical means and/or by radiation (UV; electron-beams; IR).

Usefully, the thickness of coating materials employed between the individual layers of the composite for the packaging container according to the invention is 0.1 μm to 12 μm.

The laminate adhesive may e.g. be employed in amounts of 1 to 10 g/m$^2$, preferably from 2 to 8 g/m$^2$ and in particular in an amount of 3 to 6 g/m$^2$. The laminate adhesives may also be employed in such amounts that the layers have a thickness of at least 0.1 μm and at most 12 μm.

The metal surface may by appropriate pretreatment (e.g., brushing, chromate treatment, ionizing, ozone, corona, flame or plasma treatment) exhibit better bonding for the adhesive or coating or for an extruded layer. To assist and improve the bonding of the coatings, bonding agents or laminate adhesives between the plastic films or extruded layers, it is often useful to provide the films on the sides facing the adhesive or the bonding of extruded layers with adequate surface tension. Increasing the surface tension may be effected preferably by an ionizing, ozone, plasma, flame or corona pretreatment.

The bonding of the individual layers of the laminate may also be obtained by extrusion laminating or hot calendering. The packaging containers may exhibit on their inner side, i.e., on the side facing the contents, in some cases also on their outer side, a sealing layer such as a sealing film or sealing coating. The sealing films or sealing coatings may, e.g., contain or be of polyolefins. The sealing layer makes it possible to apply a lid to the container according to the invention. Such lids may, e.g., be lid foils, which are sealed to the shoulder of the container. Suitable lid foils may contain a metal foil such as an aluminum foil and, plastic films and/or coatings may be applied to one or both sides of the metal foil. On at least one side of the lidding foil there may be an outermost layer in the form of a sealing layer via which the lidding foil may be joined to the packaging container.

On the inner side and/or outer side or directed towards the inner and/or outer side, in each case with reference to the container according to the invention, may be the composite coating and/or printed pattern.

For example, the outer lying and/or the inner lying film of the laminate may exhibit a reversed image pattern on its inner side i.e. facing the composite. A reversed image pattern is particularly suitable for transparent and translucent films.

It is also possible to provide the outer lying and/or the inner lying film with a printed pattern and as required to cover the pattern with a coating. The outer and/or the inner lying side of the composite may also be provided with a coating, whereby as required the coating may also be printed on and/or patterned on the packaging line e.g. by means of UV, solvent or by laser or electron beams.

It is also possible to provide coating layers—which may also be colored—between the other layers than the outer and inner layers and the next innermost layer. The films employed or the extruded layers may be transparent, translucent or opaque and may be clear or may be wholly or partially colored.

Typical examples of packaging containers according to the invention are laminates having a layer c) of aluminum foil or thin strip of thickness 20 to 150 $\mu$m and a layer b) in the form of a biaxially or uniaxially stretched film or a composite of two films of the polyvinylchloride, polypropylene, polyamide or polyester type having a thickness of 10 to 100 $\mu$m, whereby the layer b) covers one of the two surfaces of layer c). Both layers b) and c) are to advantage a PVC film with a thickness of 30 to 100 $\mu$m or a PET film of thickness 12 to 200 $\mu$m or a PET film of thickness 15 to 200 $\mu$m or a cPP film of thickness 20 to 200 $\mu$m or a PP film of thickness 30 to 60 $\mu$m. On the free side of layer c) of this part of a composite are further layers described below.

In a first specific embodiment the above mentioned partial composite may exhibit on the still free side of layer c) the layer $a_1$), preferably a PVC film of thickness 30 to 150 $\mu$m, a PET film of thickness 12 to 200 $\mu$m, a PE film of thickness 30 to 60 $\mu$m, a PP film of thickness 30 to 60 $\mu$m, a cPP film of thickness 20 to 200 $\mu$m, an ionomer layer with ethylene acrylic acid (EAA), e.g. a Surlyn layer of 10 to 100 g/m² (ca. 11 to 110 $\mu$m), or an extruded polyolefin layer of thickness 20 to 200 $\mu$m.

In a second specific embodiment the above mentioned partial composite may have applied to its still free layer c) e.g. a layer b1), an oPA film of thickness 15 to 25 $\mu$m or a PET film, in particular a PEN film, of thickness 12 to 50 $\mu$m or an oPVC film of thickness 40 to 100 $\mu$m and on top of a layer of bonding agent the layer a1), a PE film of thickness 15 to 100 $\mu$m or a PP film of thickness 30 to 60 $\mu$m or a cPP film of thickness 20 to 100 $\mu$m or a PET film of thickness 12 to 200 $\mu$m or a PVC film of thickness 30 to 150 $\mu$m may be applied.

Preferred examples of packaging containers according to the invention exhibit composites with a layer structure containing

| a) | b) | c) | $a_1$) |
|---|---|---|---|
| PVC 60-100 $\mu$m | oPA 25 $\mu$m | Al 45-60 $\mu$m | PVC 60-100 $\mu$m | or as further examples:

| a) | b) | c) | $b_1$) | $a_1$) |
|---|---|---|---|---|
| 60 PVC | 25 oPA | 60 Al | | 60 PVC, |
| 60 PP | 25 oPA | 60 AL | | 60 PP, |
| 40 PP | 20 oPP | 80 Al | 20 oPP | 40 PP, |
| 100 PVC | 15 oPA | 45 Al | | 100 PVC, |
| 50 PET | 25 PEN | 60 AL | 25 PEN | 50 PET, |
| 30 PP | 25 oPA | 60 Al | 25 oPA | 30 PP, |
| 40 PE | 15 oPA | 30 Al | 15 oPA | 40 PE |
| 60 PVC or | 40 oPVC | 60 AL | 40 oPVC | 60 PVC |
| 40 PP | 2 × 15 oPA | 45 Al | | 60 PP, | where the numbers are the thickness of the layers in $\mu$m and PVC stands for polyvinylchloride, oPVC for uniaxially oriented polyvinylchloride, PP for polypropylene, PET for polyethylene-terephthalate, PE for polyethylene, oPA for oriented polyamide, PEN for polyester of the PEN type, Al for aluminium foil, oPP for oriented polypropylene and PP for polypropylene.

Typical, practical examples are described in the following. In each case the thickness of the bonding layers is from 0.1 to 10.0 $\mu$m.

Example 1)

a) PVC film 30 to 100 $\mu$m
laminating agent
b) oPA film 10 to 50 $\mu$m
laminating agent
c) Al foil 20 to 100 $\mu$m
laminating agent
$a_1$) PVC film 30 to 100 $\mu$m Example 2)

a) cPP film 20 to 200 $\mu$m
laminating agent
b) 2 × oPP film 12 to 50 $\mu$m
laminating agent
c) Al foil 20 to 100 $\mu$m
laminating agent
$b_1$) oPP film 12 to 50 $\mu$m
laminating agent
$a_1$) cPP film 20 to 100 $\mu$m Example 3)

a) PET film 12 to 200 $\mu$m
laminating agent
b) oPA film 10 to 50
laminating agent
c) Al foil 20 to 150 $\mu$m
laminating agent
Print
$a_1$) PVC film 30 to 150 $\mu$m Example 4)

a) cPP film 20 to 200
bonding agent
b) oPA film 12 to 50 $\mu$m
bonding agent
c) Al foil 20 to 150 $\mu$m
bonding agent
$b_1$) oPA film 12 to 50 $\mu$m
bonding agent
$a_1$) cPP film 20 to 100 $\mu$m Example 5)

Coating
print (up to 100% of surface)
a) PVC film 30 to 100 $\mu$m
laminating agent
b) oPP film 12 to 50 $\mu$m
laminating agent
c) Al foil 20 to 100 $\mu$m
laminating agent
a1) PVC film 30 to 100 $\mu$m Example 6)

a) PET film 12 to 200 $\mu$m
print (up to 100% of surface)
laminating agent
b) oPA film 12 to 50 $\mu$m
laminating agent
c) Al foil 20 to 100 $\mu$m
bonding agent (coloured)
$a_1$) PET film 12 to 200 $\mu$m Example 7)

a) PE film 15 to 200 $\mu$m
extrusion lamination
b) oPA film 10 to 50 $\mu$m
laminating agent
c) Al foil 20 to 100 $\mu$m
$a_1$) Surlyn 10 to 100 g/m²

Example 8)

a) PEN film 20 to 200 $\mu$m
bonding agent
b) oPA film 12 to 50 $\mu$m
bonding agent
c) Al foil 20 to 100 $\mu$m
bonding agent
$b_1$) PEN film 12 to 50 $\mu$m
$a_1$) Extrusion polyolefin The packaging containers according to the present invention are manufactured by cold forming which includes e.g. the methods of stretch drawing or deep drawing or a combined process of deep and stretch drawing. The temperature of the tool used in the process may be from 30 to 150° C., usefully from 40 to 100° C. The drawing ratios achieved in the forming process are from 2 to 4, preferably 2.5 to 3.5 (breadth/height).

By packaging containers is meant cold formed base parts or lid parts or base and lid parts. The base part or the lid part may be shaped by cold forming and a lidding foil or a base foil may correspondingly form the closure of the container. Both the base and the lid part may be formed by cold forming, whereby the recesses formed in the base and lid parts usefully lie one on top of the other. The packaging containers may exhibit one or more e.g. 2 to 200, usefully 5 to 50 recesses, whereby each recess is usefully surrounded by a shoulder and the shoulders form a flat shoulder area. The recesses usually formed out of the surface may all be the same or different. A packaging container according to the invention may e.g. represent a base part of a shaped form of packaging such as a menu dish e.g. for human or animal foodstuffs, a push-through pack or blister pack, such as a blister pack for pharmaceuticals or a blister pack to accommodate preparations for further use in medical equipment, and other products that have to be protected. The shaped base part or lid part may be covered with a covering material such as foil or laminate acting as lidding material, in particular closing the shaped packaging container at the shoulder area. Preferred are lidding materials that can be penetrated by application of pressure. Particularly suitable lidding materials are aluminium foils or composites containing aluminium foil or plastic films that have been rendered brittle by fillers. Usefully, the lidding foils bear a sealable layer on at least one side. Suitable for closing purposes (sealing) are all known methods (hot sealing, ultrasonics, induction heating, high frequency heating). The packaging container is usefully joined to the lidding material via whole surface or partial sealing in the shoulder region. The recesses are surrounded by shoulders which form the shoulder areas, and each recess may be tightly sealed by the sealing joint in the region of the shoulders at each recess. Such a closed packaging container may be opened e.g. by cutting open or peeling away the lidding material, or the lid may be a fastening or the lidding material may be torn open by pressing against the contents. In some cases the plane material may also represent the base and the lid the shaped packaging container. Further, both the lid and the base may be manufactured from the composite according to the invention and form a packaging container according to the invention.

Of particular interest are packaging containers according to the invention featuring a plurality of shaped recesses in one of the described composites where in plan view the base part exhibits a round shape and the recesses are arranged in a concentric manner e.g. in one or two rings. The base part is e.g. covered by a push-through type lidding foil and the base part and lidding foil are releasably joined by sealing. The packaging containers may contain diagnostic aids for medical analytical equipment. In order to improve machine control, the packaging container may exhibit, e.g. at its outermost edge, markings that can be sensed either mechanically or optically.

The composite material may be fabricated in an endless form (rolls, coils) and be shaped in this form before being divided into individual lengths, or the composite material may be produced in individual lengths or in an endless form and the individual lengths shaped and processed further.

The present invention also relates to the use of the packaging container according to the invention for packaging pharmaceuticals, medical aids, diagnostic aids and other products that are sensitive to temperature, light, gas and/or moisture. This means that the packaging containers are suitable e.g. especially for packaging substances that should be protected to prevent substances in the contents, such as e.g. gases, solvents or aromatic substances from diffusing out of the packaging. Further, the packaging container also protects contents from external influences such as those of a mechanical nature as well as diffusion of gases, vapours and fluids and protects them from electromagnetic radiation such as light.

The shaped packaging material according to the present invention exhibits a high degree of flatness i.e. also after shaping the packaging containers and the contents do not arch, this neither as endless material, in single lengths nor as shaped packaging container. As a rule the shaped packaging container exhibits a high degree of stiffness, the high degree of flatness always being provided independent of the stiffness. The packaging containers are intact and do not exhibit any cracks as a result of processing.

The high degree of stiffness and flatness can be improved further by a symmetrical make up of the composite material. It was to be expected that a stiffening of the composite material could be achieved by strengthening the inner layer. It was found, however, that as a result of an additional outer layer and symmetrical make up, a surprising improvement in the properties of the composite and the packaging container made therefrom can be achieved.

Further, a reduction in migration, both from inside to outside and in the opposite direction, was observed—this also through a thinner sealing joint between the packaging container and the lid.

The packaging material exhibits a high degree of formability and packaging containers of widely different shapes may be made from it.

As a result of the symmetrical make up of the packaging material, the latter exhibits a low degree of spring-back when formed.

As a result of the make up according to the invention, the packaging container obtains stiffening due to the outer part of the composite; at the same time, however, a high degree of formability is achieved with minimum spring back.

What is claimed is:

1. A packaging container comprising a cold formed composite, the cold formed composite has a layered structure consisting essentially of in sequential order:
   (a) a plastic film having a thickness of 10 to 250 $\mu$m;
   (b) a biaxially or uniaxially stretched film of the polyvinylchloride, polyolefin, polyamide or polyester having a thickness of 10 to 100 $\mu$m, or a biaxially or uniaxially stretched plastic laminate of two films of the polyvinylchloride, polyolefin, polyamide, or polyester with each film having a thickness of 10 to 50 $\mu$m;
   (c) a metal foil having a thickness of 20 to 200 $\mu$m;
   (d) a biaxially or uniaxially stretched film of the polyvinylchloride, polyolefin, polyamide or polyester having a thickness of 10 to 100 $\mu$m, or a biaxially or uniaxially stretched plastic laminate of two films of the polyvinylchloride, polyolefin, polyamide, or polyester with each film having a thickness of 10 to 50 $\mu$m;
   (e) a plastic film having a thickness of 10 to 250 $\mu$m.

2. The packaging container according to claim 1, wherein film (a) is nonstretched.

3. A shape-retaining packaging container with high flat plane for packaging contents sensitive to mechanical effects, for packaging processes involving (i) vacuum or (ii) low temperature or (iii) vacuum and low temperature, comprising a cold formed composite, the composite has a layered structure consisting essentially of in sequential order:
- (a) a first polyvinylchloride film having a thickness of 30 to 100 μm, or a first polyolefin film having a thickness of 30 to 100 μm, or a first polyester film having a thickness of 30 to 100 μm;
- (b) an optional first laminate adhesive layer;
- (c) a first biaxially or monoaxially stretched film of the polyamide film and having a thickness of 12 to 50 μm, or a first biaxially or monoaxially stretched plastic laminate made up of two polyamide films with each having a thickness of 10 to 50 μm;
- (d) an optional second laminate adhesive layer;
- (e) a metal foil having a thickness of 20 to 200 μm;
- (f) an optional third laminate adhesive layer;
- (g) a second biaxially or monoaxially stretched film of the polyamide film and having a thickness or 12 to 50 μm, or a second biaxially or monoaxially stretched plastic laminate made up of two polyamide films with each film having a thickness of 10 to 50 μm;
- (h) an optional fourth laminate adhesive layer; and
- (i) a second polyvinylchloride film having a thickness of 30 to 100 μm, or a second polyolefin film having a thickness of 30 to 100 μm, or a second polyester film having a thickness of 30 to 100 μm, the packaging container exhibits a high flat plane and high rigidity, said layered structure having a symmetric sequence of layers relative to layer (e).

4. The packaging container according to claim 3, wherein the metal foil (e) is an aluminum foil.

5. The packaging container according to claim 4, wherein the aluminum foil has a thickness of 20 to 150 μm.

6. The packaging container according to claim 3, wherein the composite exhibits a layer structure containing:
- (a) a first PVC film having a thickness of 30 to 100 μm, or a first PET film having a thickness of 30 to 100 μm, or a first PE film having a thickness of 30 to 100 μm, or a first oPP film having a thickness of 30 to 100 μm, or a first PP film having a thickness of 30 to 100 μm;
- (b) a first laminate adhesive layer;
- (c) a first biaxially or monoaxially stretched film of the polyamide series having a thickness of 12 to 50 μm;
- (d) a second laminate adhesive layer;
- (e) an aluminum foil having a thickness of 20 to 150 μm;
- (f) a third laminate adhesive layer;
- (g) a second biaxially or monoaxially stretched film of the polyamide series having a thickness of 12 to 50 μm;
- (h) a fourth laminate adhesive layer; and
- (i) a second PVC film having a thickness of 30 to 100 μm, or a second PET film having a thickness of 30 to 100 μm, or a second PE film having a thickness of 30 to 100 μm, or a second oPP film having a thickness of 30 to 100 μm, or a second PP film having a thickness of 30 to 100 μm, wherein PVC stands for polyvinylchloride, PET stands for polyethylene terephthalate, PE stands for polyethylene, PP stands for polypropylene, and oPP stands for oriented polypropylene.

7. The packaging container according to claim 3, wherein the composite has a layer structure containing the layers:
- (a) a first PVC film having a thickness of 60 to 100 μm;
- (b) a first adhesive layer;
- (c) a first oPA film having a thickness of 25 μm;
- (d) a second adhesive layer;
- (e) Al foil having a thickness of 45 to 60 μm;
- (f) a third adhesive layer;
- (g) a second oPA film having a thickness of 25 μm;
- (h) a fourth adhesive layer; and
- (i) a second PVC film having a thickness of 60 to 100 μm, wherein the numbers indicate the thickness of the layers in μm and PVC stands for polyvinylchloride, oPA for oriented polyamide, and Al for aluminum foil.

8. The packaging container according to claim 3, wherein the composite has a layer structure containing the layers:
- (a) a first PVC film having a thickness of 60 μm;
- (b) a first adhesive layer;
- (c) a first oPA film having a thickness of 25 μm;
- (d) a second adhesive layer;
- (e) Al foil having a thickness of 60 μm;
- (f) a third adhesive layer;
- (g) a second oPA film having a thickness of 25 μm;
- (h) a fourth adhesive layer; and
- (i) a second PVC film having a thickness of 60 μm, wherein the numbers indicate the thickness of the layers in μm and PVC stands for polyvinylchloride, oPA for oriented polyamide, and Al for aluminum foil.

9. The packaging container according to claim 3, wherein the composite has a layer structure containing the layers:
- (a) a first PVC film having a thickness of 60 μm;
- (b) a first adhesive layer;
- (c) a first oPA film having a thickness of 25 μm;
- (d) a second adhesive layer;
- (e) Al foil having a thickness of 60 μm;
- (f) a third adhesive layer;
- (g) a second oPA film having a thickness of 25 μm;
- (h) a fourth adhesive; and
- (i) a second PVC film having a thickness of 60 μm, wherein the numbers indicate the thickness of the layers in μm and PVC stands for polyvinylchloride, oPA for oriented polyamide, and Al for aluminum foil.

10. The packaging container according to claim 3, wherein the composite has a layer structure containing the layers:
- (a) a first PVC film having a thickness of 100 μm;
- (b) a first adhesive layer;
- (c) a first oPA film having a thickness of 15 μm;
- (d) a second adhesive layer;
- (e) Al foil having a thickness of 45 μm;
- (f) a third adhesive layer;
- (g) a second oPA film having a thickness of 15 μm;
- (h) a fourth adhesive layer; and
- (i) a second PVC film having a thickness of 100 μm, wherein the numbers indicate the thickness of the layers in μm and PVC stands for polyvinylchloride, oPA for oriented polyamide, and Al for aluminum foil.

11. The packaging container according to claim 3, wherein the composite has a layer structure containing the layers:
- (a) a first PP film having a thickness of 60 μm;
- (b) a first adhesive layer;
- (c) a first oPA film composed of two oPA layers, each having a thickness of 15 μm;

(d) a second adhesive layer;
(e) Al foil having a thickness of 45 μm;
(f) a third adhesive layer;
(g) a second oPA film composed of two oPA layers, each having a thickness of 15 μm;
(h) a fourth adhesive layer; and
(i) a second PVC film having a thickness of 60 μm, wherein the numbers indicate the thickness of the layers in μm and PP stands for polypropylene, oPA for oriented polyamide, and Al for aluminum foil.

12. A process for manufacturing shaped packaging containers according to claim 3, comprising deepening the composites by means of cold forming using deep drawing or stretch drawing, or a combination of deep drawing and stretch drawing.

13. A process for manufacturing shaped packaging containers according to claim 3, comprising deepening the composites by means of cold forming and are worked using a support temperature of 40° C. to 100° C.

14. A process comprising packaging light-sensitive, gas-sensitive, or moisture-sensitive products, pharmaceuticals, medical auxiliaries, diagnostic goods, and foodstuffs for humans and animals in packaging containers according to claim 3.

15. The process according to claim 14, wherein pharmaceutical preparations are freeze-dried packaged in the packaging containers.

16. The process according to claim 15, wherein the packaging container is in the form of a base part which is round shaped in plane view and has concentrically arranged recesses and a sealed-on lid foil covering the base part.

* * * * *